(12) United States Patent
Moore

(10) Patent No.: US 7,963,114 B2
(45) Date of Patent: Jun. 21, 2011

(54) HYDRAULIC BRAKE LEVER ASSEMBLY

(76) Inventor: Wayne-Ian Moore, Changhua (TW)

( * ) Notice: Subject to any disclaimer, the term of this patent is extended or adjusted under 35 U.S.C. 154(b) by 509 days.

(21) Appl. No.: 12/197,310

(22) Filed: Aug. 24, 2008

(65) Prior Publication Data

US 2010/0043426 A1    Feb. 25, 2010

(51) Int. Cl.
*B60T 11/00*   (2006.01)
*B60T 13/00*   (2006.01)
(52) U.S. Cl. .................. 60/594; 60/547.1; 188/344
(58) Field of Classification Search .............. 60/547.1, 60/551, 574, 576, 594; 188/151 R, 344
See application file for complete search history.

(56) References Cited

U.S. PATENT DOCUMENTS

| 7,380,646 B1 * | 6/2008 | Takachi ................ 60/547.1 |
| 7,389,642 B2 * | 6/2008 | Takizawa et al. ........... 60/547.1 |

* cited by examiner

Primary Examiner — Thomas E Lazo

(57) ABSTRACT

A hydraulic brake lever assembly includes a master cylinder, a master piston, and a floating piston. Both of the master piston and the floating piston are sealingly and movably received in the master cylinder. The master piston has a passage diametrically defined therein and extending therethrough for receiving a bias mechanism. The floating piston has a through hole for coaxially and sealingly receiving the master piston. The floating piston has two raceways radially and symmetrically extending from the through hole therein. The bias mechanism is movably disposed between the two raceways. Each raceway has a trough defined in a bottom thereof. The bias mechanism moves along the troughs and the raceways to provide the effort of multi-stage movement and different braking feel.

15 Claims, 8 Drawing Sheets

US 7,963,114 B2

HYDRAULIC BRAKE LEVER ASSEMBLY

BACKGROUND OF THE INVENTION

1. Field of the Invention

The present invention relates to a brake lever assembly, and more particularly to a hydraulic brake lever assembly with multi-stage movement.

2. Description of Related Art

A conventional hydraulic brake system includes a hydraulic brake lever assembly and a hydraulic brake caliper assembly connected with the hydraulic brake lever assembly by an oil tube. The hydraulic brake lever assembly is mounted on a handlebar of a bicycle/motorcycle and the hydraulic brake caliper assembly is mounted on a frame or a fork of the bicycle/motorcycle. By the connection of the oil tube, the oil is compressed and flows between the hydraulic brake lever assembly and the hydraulic brake caliper assembly. The conventional hydraulic brake lever assembly in accordance with the prior art includes a first cylinder having a first cylindrical body and a first piston disposed therein and a lever connected to the first cylinder. The hydraulic brake caliper assembly includes a second cylinder having a second cylindrical body and a second piston disposed therein. When pulling the lever to drive the first piston, the oil pressure in the first cylinder is transferred to the second cylinder. Therefore the second piston is driven to push a brake shoe to a disk/rotor for braking purpose. A special type of hydraulic brake caliper assembly also provides two stages braking. For different braking purpose, the hydraulic brake caliper assembly provides a speed reduction stage for gradually providing a braking force and an emergency braking stage for quickly providing a great braking force. However it still has the problem that the rider does not know which stage the hydraulic brake caliper assembly currently actuated when pulling the lever. Therefore the braking force is not controlled by the rider's will. It is dangerous for the rider to provide more braking force when the rider thinks that the current stage is in the speed reduction stage.

Furthermore, in a conventional hydraulic brake lever is quite limited. Once the pads have been pressed against the disk/rotor no further lever travel can occur due to the incompressibility of the fluid, this lack of movement results in poor rider sensitivity and hence the potential for unsmooth braking.

The present invention has arisen to mitigate and/or obviate the disadvantages of the conventional hydraulic brake lever assembly.

SUMMARY OF THE INVENTION

The main objective of the present invention is to provide an improved hydraulic brake lever assembly, in that a multi-stage hydraulic brake lever assembly with different braking feel is acquired.

To achieve the objective, the hydraulic brake lever assembly comprises a master cylinder, a master piston sealingly and movably received in the master cylinder, a floating piston sealingly and movably received in the master cylinder, and a lever pivotally connected to the master cylinder and operatively connected to the master piston. The master cylinder has a main space define therein for receiving the master piston. The master piston is sealingly and coaxially disposed in the main space. One end of the master piston is operatively connected with an actuating rod. The master piston has a passage diametrically defined therein and extending therethrough for receiving a bias mechanism. The bias mechanism includes a sleeve, a compress spring placed in the sleeve, two supports respectively connected to one end of the compress spring, and two rollers respectively connected to one of the two supports. The sleeve is movably received in the passage. The floating piston is sealingly and coaxially disposed in the main space. The floating piston has a through hole centrally defined therein for coaxially and sealingly receiving the master piston. The floating piston has two raceways radially and symmetrically extending from the through hole therein. The bias mechanism is movably disposed between the two raceways. Each roller of the bias mechanism movably connects to the corresponding one of the two raceways. Each raceway has a trough defined in a bottom thereof. One end of the lever is pivotally connected to the master cylinder and a middle of the lever is operatively connected to the actuating rod. When the lever rotates, the actuating rod is moved simultaneously to drive the master piston. The rollers of bias mechanism move along the troughs and the raceways to provide the effort of multi-stage movement and different braking feel.

Moreover the hydraulic brake lever assembly further comprises a slave piston sealingly and movably disposed in the master cylinder and being axially perpendicular to the master piston for improving braking feel.

Further benefits and advantages of the present invention will become apparent after a careful reading of the detailed description with appropriate reference to the accompanying drawings.

DETAILED DESCRIPTION OF THE INVENTION

Figure 1:
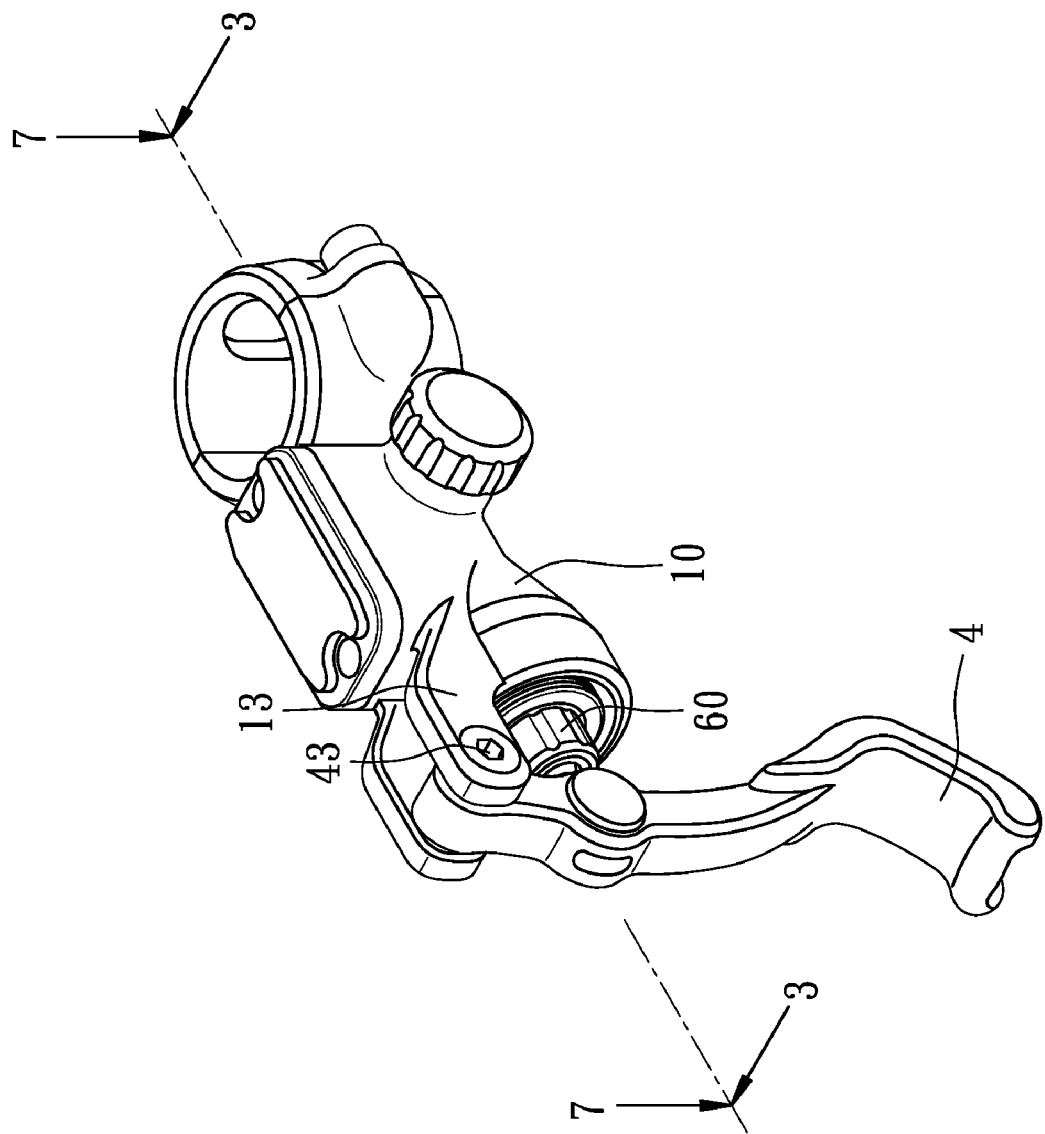
FIG. 1 is an assembled perspective view of a hydraulic brake lever assembly in accordance with the present invention.
Figure 2:
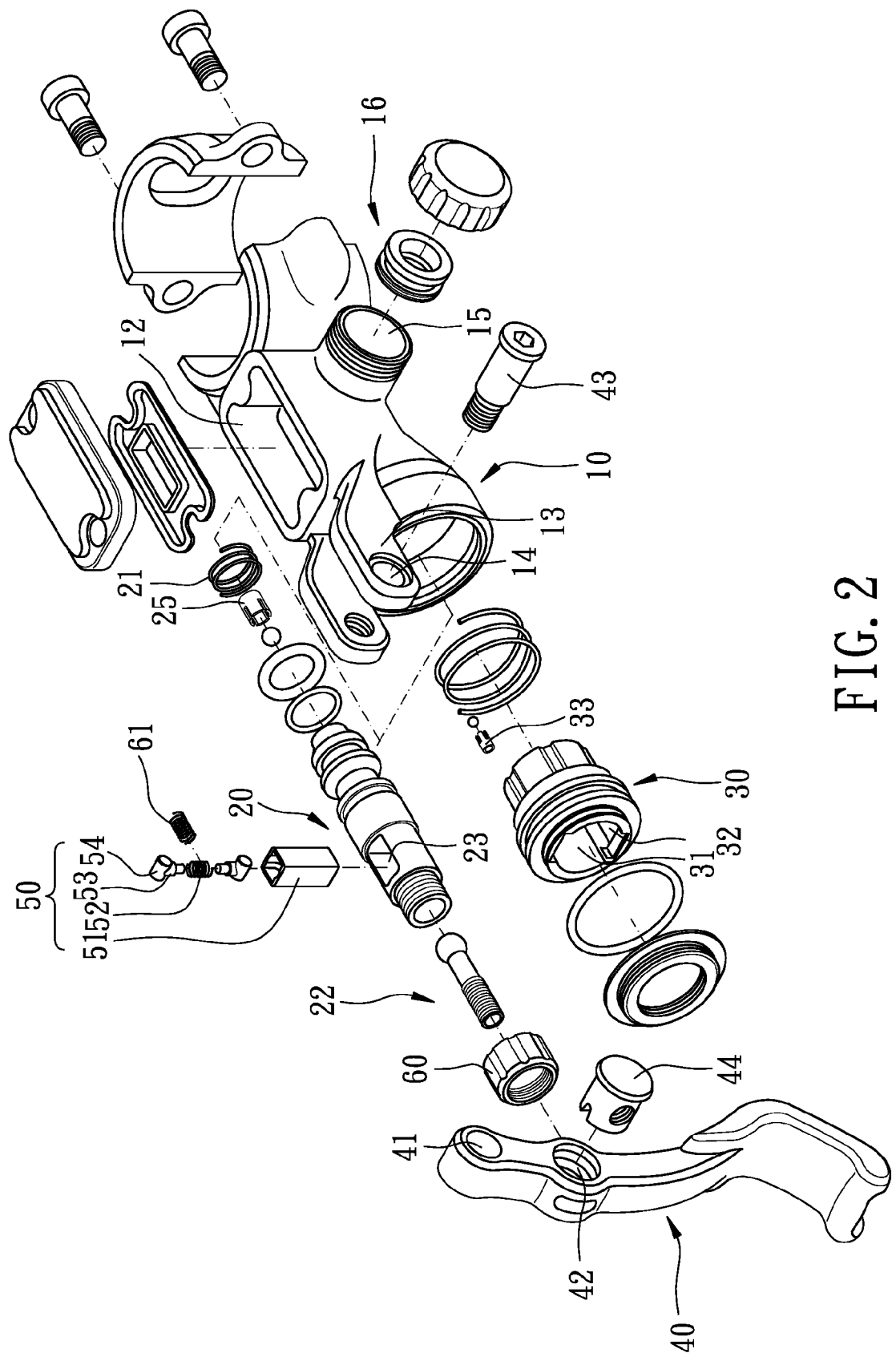
FIG. 2 is an exploded perspective view of the hydraulic brake lever assembly in FIG. 1.
Figure 3:
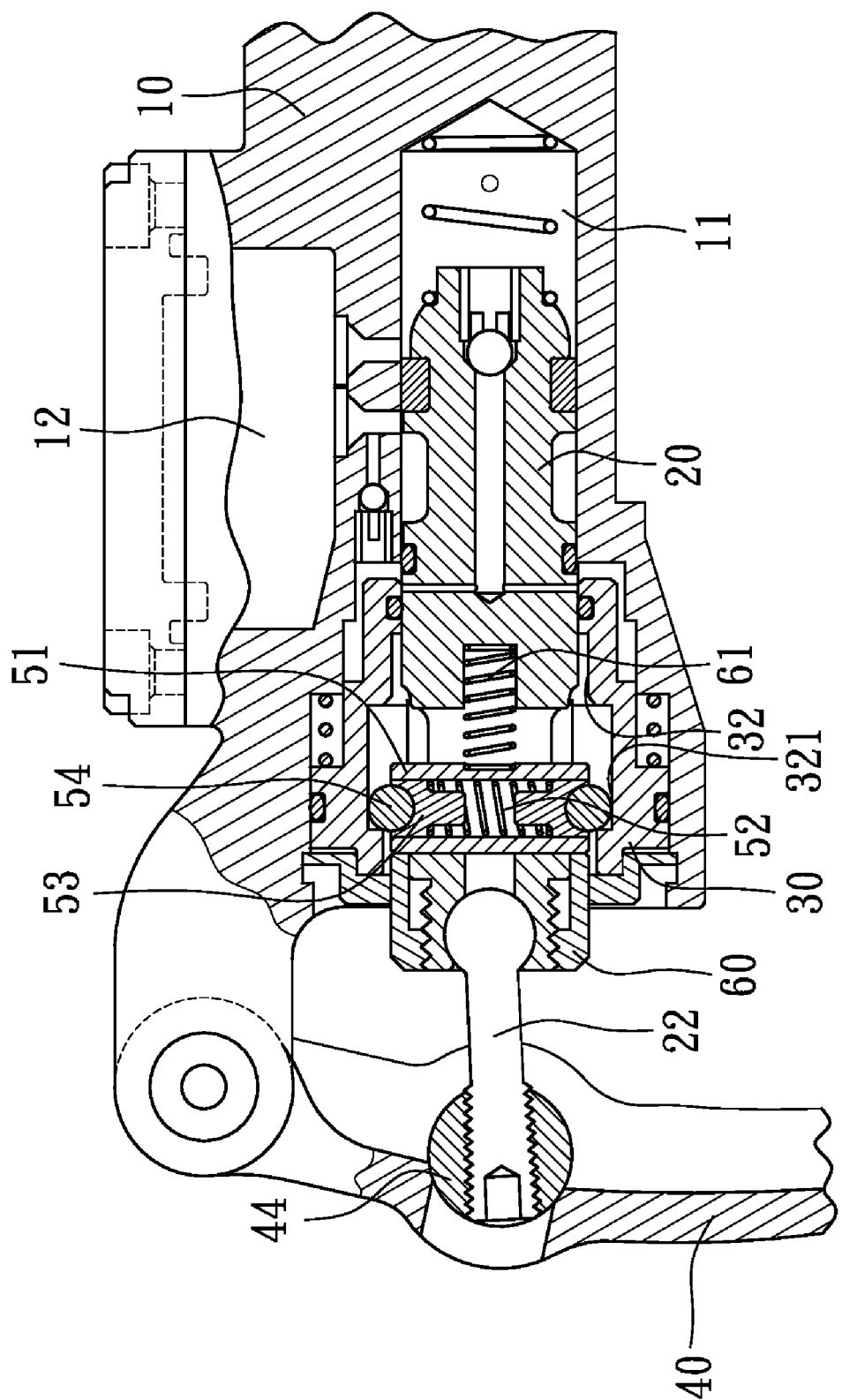
FIG. 3 is a partial cross-sectional view of the hydraulic brake lever assembly in FIG. 1 taken along line 3-3.

Referring to the drawings and initially to FIGS. 1-3, a hydraulic brake lever assembly in accordance with the present invention comprises a master cylinder 10, a master piston 20 sealingly and movably received in the master cylinder 10, a floating piston 30 sealingly and movably received in the master cylinder 10, and a lever 40 pivotally connected to the master cylinder 10 and operatively connected to the master piston 20.

The master cylinder 10 generally has a main space 11 longitudinally defined therein for reciprocally receiving the master piston 20, and having a closed inner end and an opened outer end corresponding to the lever 40. The master cylinder 10 has a reservoir 12 laterally disposed therein and hydraulically communicated with the main space 11. The main space 11 and the reservoir 12 are filled with hydraulic oil. The master cylinder 10 has two ears 13 outwardly extending from one end thereof toward the lever 40. Each ear 13 has a through hole 14 laterally defined therein.

The master piston 20 is sealingly and coaxially disposed in the main space 11. A first return spring 21 is longitudinally and compressively disposed between the master piston 20 and the inner end of the main space 11 for providing a restitution force to the master piston 20. One end of the master piston 20 is connected to the first return spring 21 and the other is operatively connected with an actuating rod 22. The master piston 20 has a passage 23 diametrically defined therein and extending therethrough for receiving a bias mechanism 50. An axis of the passage 23 is perpendicular to an axis of the master piston 20.

The bias mechanism 50 includes a sleeve 51, a compress spring 52 placed in the sleeve 51 and having two opposite ends each having a support 53 connected thereto, and two rollers 54 respectively connected to a corresponding one of the two supports 53. The sleeve 51 is movably received in the passage 23 and has an axis parallel to that of the passage 23. One end of each support 53 has a female portion (not numbered) for partially rotatably receiving a corresponding one of the two rollers 54. The other end of each support 53 has a shoulder (not numbered) for securely mounted with the compress spring 52.

The floating piston 30 is sealingly and reciprocally movably received in the main space 11. The floating piston 30 has a through hole 31 defined therein and extending along an axis thereof for coaxially and sealingly receiving the master piston 20. The floating piston 30 has two raceways 32 radially defined in an inner periphery of the through hole 31 and diametrically corresponding to each other. The bias mechanism 50 is movably disposed between the two raceways 32. Each raceway 32 has a trough 321 defined in a bottom thereof. Each roller 54 of the bias mechanism 50 movably connects to a corresponding one of the two troughs 321.

The lever 40 has a pivotal hole 41 in one end thereof and a bore 42 in a middle thereof. A pin 43 passes through one of the through holes 14 in the ear 13, the pivotal hole 41, and the other one of the through holes 14 in the ear 13 sequentially, wherein the pin 43 is used as a fulcrum of the lever. A connector 44 is rotatably inserted into the bore 42 and laterally threadedly connected to the actuating rod 22. When the lever 40 rotates about the pin 43, the actuating rod 22 is moved simultaneously to inward drive the master piston 20.

Figure 4:
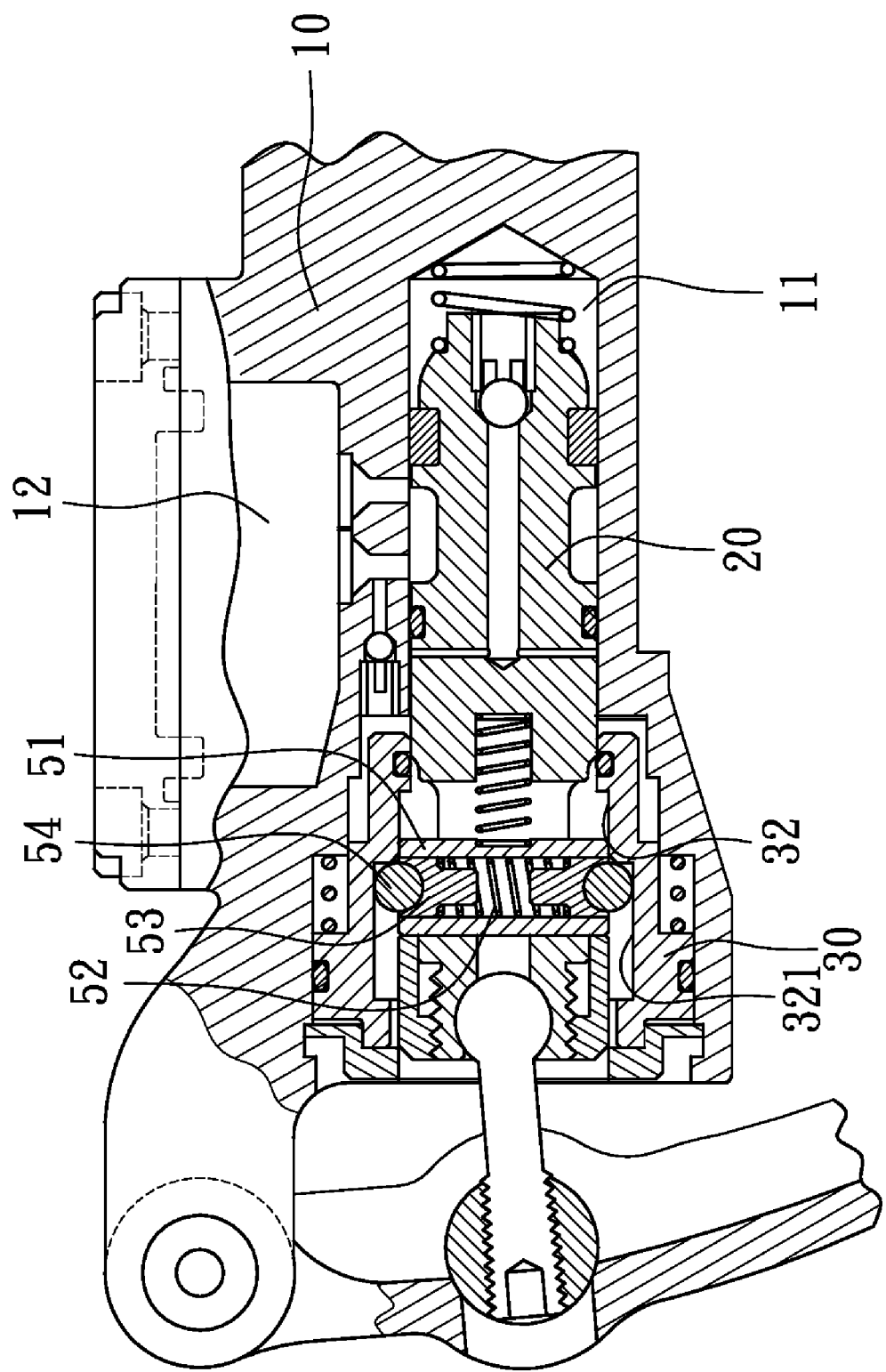
FIG. 4 is a partial cross-sectional view of the hydraulic brake lever assembly in FIG. 1 when the hydraulic brake lever assembly actuates the first stage movement.
Figure 5:
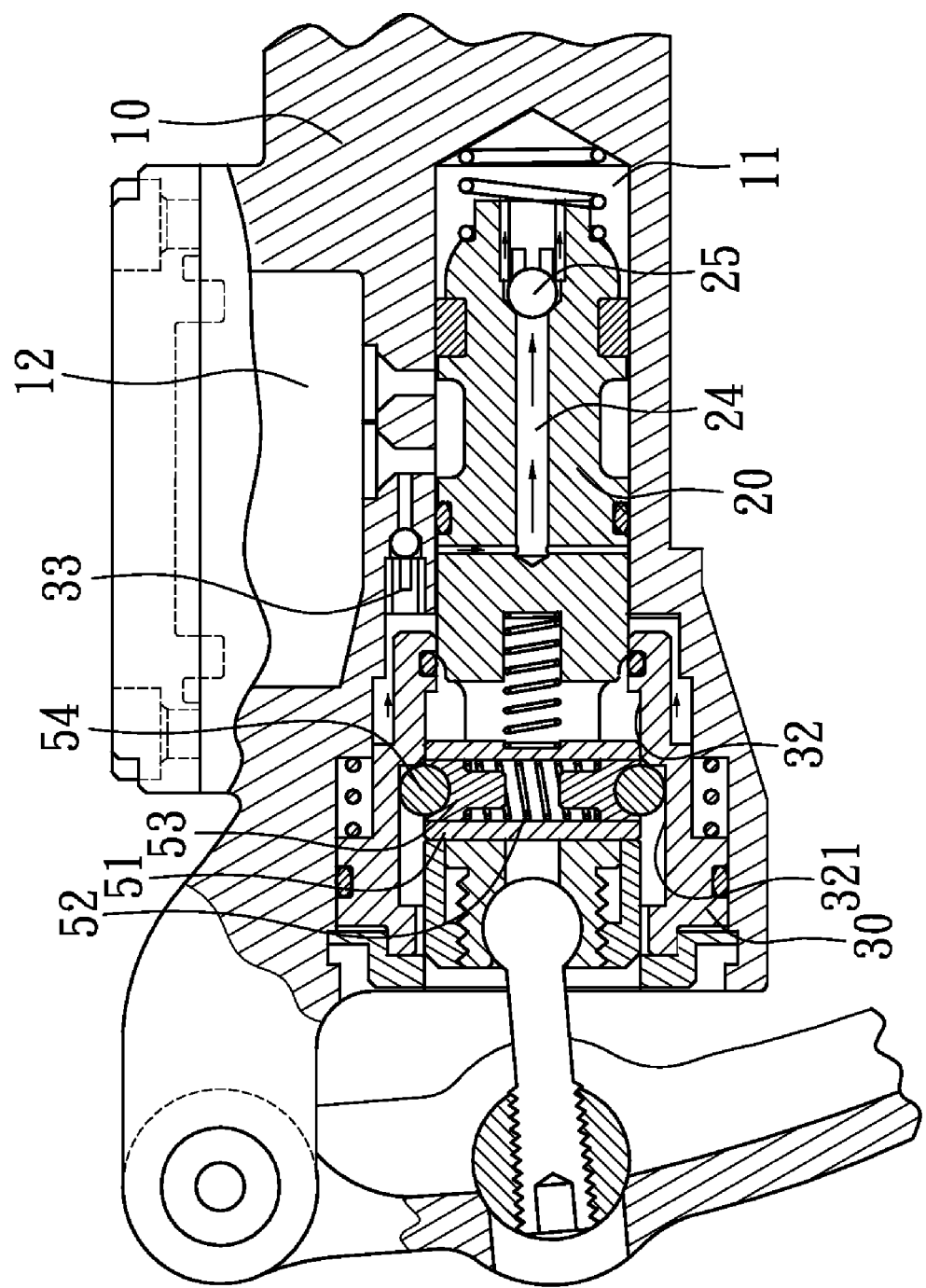
FIG. 5 is a partial cross-sectional view of the hydraulic brake lever assembly in FIG. 1 when the hydraulic brake lever assembly actuates the second stage movement.
Figure 6:
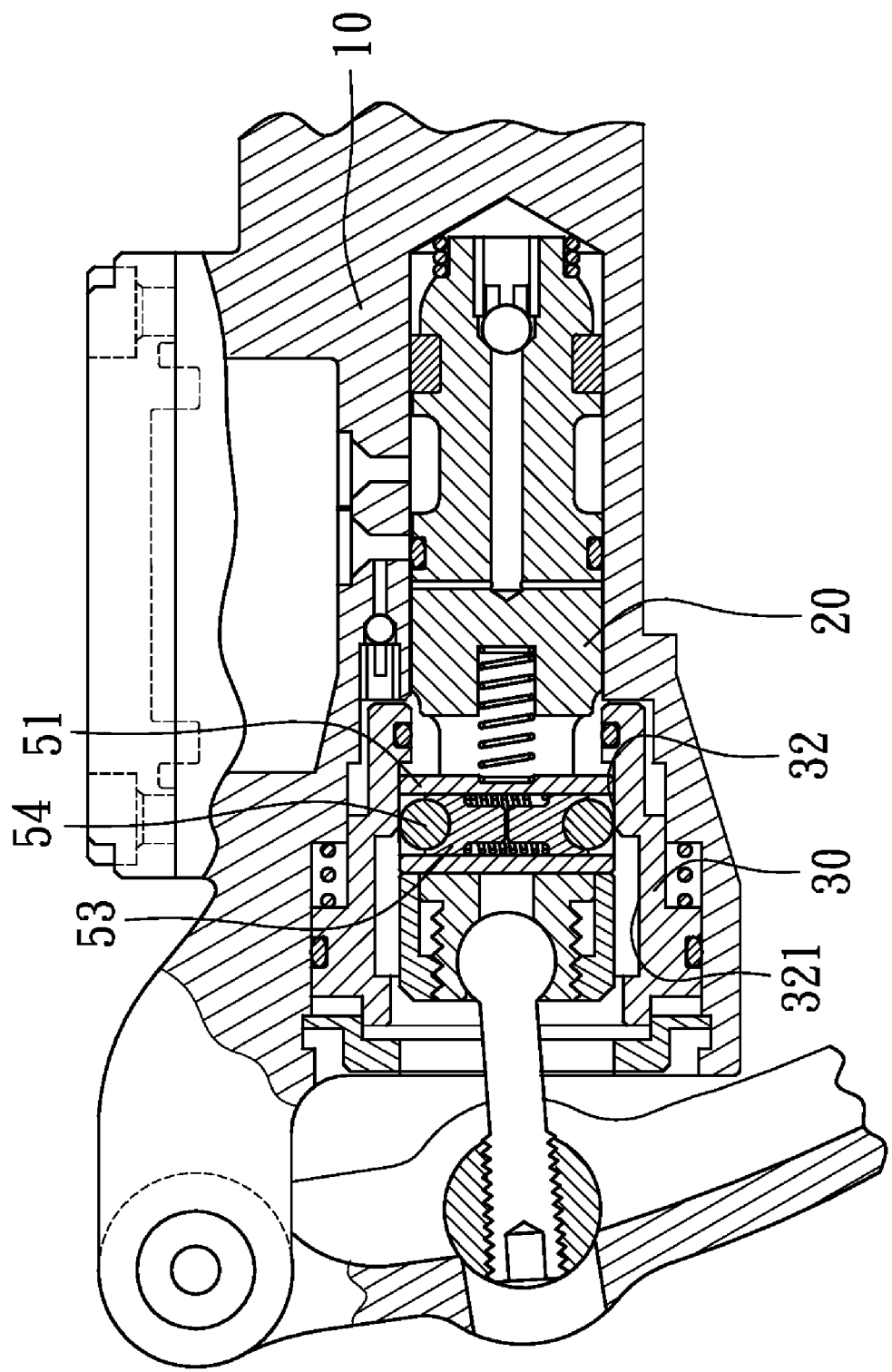
FIG. 6 is a partial cross-sectional view of the hydraulic brake lever assembly in FIG. 1 when the hydraulic brake lever assembly actuates the third stage movement.

Referring to FIGS. 3 to 6, the operation of the hydraulic brake lever assembly in accordance with the present invention is shown. Each roller 54 of the bias mechanism 50 is located on the corresponding trough 321 of the raceways 32 in an initial state as shown in FIG. 3. When the rider wants to slow down, he/she pulls the lever 40. In the meantime, the actuating rod 22 inward pushes the master piston 20 to pressurize the hydraulic brake system. Each roller 54 of the bias mechanism 50 moves along the corresponding trough 321 in a first stage movement as shown in FIG. 4. When the rider wants more baking force, he/she keeps pulling the lever 40. The floating piston 30 is inward driven by the rollers 54 of bias mechanism 50 when the rollers 54 reach a distal end of each of the two raceways 32 in a second stage movement as shown in FIG. 5. The floating piston 30 is pushed to pressurize a space between the floating piston 30 and the master cylinder 10. A first check valve 33 disposed between the reservoir 12 and the main space 11 in master cylinder 10 is closed due to the high pressure from the master cylinder 10 such that oil flows into an inner channel 24 which is defined in the master piston 20. A second check valve 25 disposed between the inner channel 24 and the main space 11 in the master cylinder 10 is opened due the high pressure in the inner channel 24. Therefore, more oil flows into the main space 11 in the master cylinder 10 to provide more oil for the hydraulic brake system. When the rider wants an emergency braking, he/she pulls the lever 40 hard. The floating piston 30 stops and then the rollers 54 bias the compress spring 52. The rollers 54 step over the troughs 321 and then inward move along the raceways 32 by a force provided by the rider in a third stage movement as shown in FIG. 6. The master piston 20 is moved to pressurize the hydraulic brake system. When the rider releases the lever 40, the master piston 20/the floating piston 30 is pushed by the resilient force to restore to the initial state.

The braking feel from the first stage movement to the second movement is different because the rider needs to increase more hand load to resist the resilient force acting on the floating piston 30 in the second movement. The braking feel between the second stage movement and the third movement is distinctly different because the ride needs to increase more hand load to bias the compress spring 52 and push the rollers 54 to step over the troughs 32. Therefore, the rider clearly knows when the hydraulic brake system activates the different stages. Furthermore, more oil is fed in the second stage movement to displace a large piston in the caliper assembly.

Furthermore, a travel distance in the first stage movement is adjustable. The hydraulic brake lever assembly in accordance with the present invention further includes an adjusting nut 60 threadedly mounted to the master piston 20. One end of the adjusting nut 60 abuts to the sleeve 51 of the bias mechanism 50. An adjusting spring 61 is disposed in the passage 23. One end of the adjusting spring 61 is fixed in the passage 23 and the other end of the adjusting spring 61 abuts against the sleeve 51. The bias mechanism 50 moves in the passage 23 and along the raceways 32 by rotating the adjusting nut 60, and therefore the travel distance in the first stage movement is adjusted. If the travel distance is short, a response time is decreased. On the contrary, the response time is increased. Therefore, the rider can adjust the travel distance by his/her need or purpose.

Figure 7:
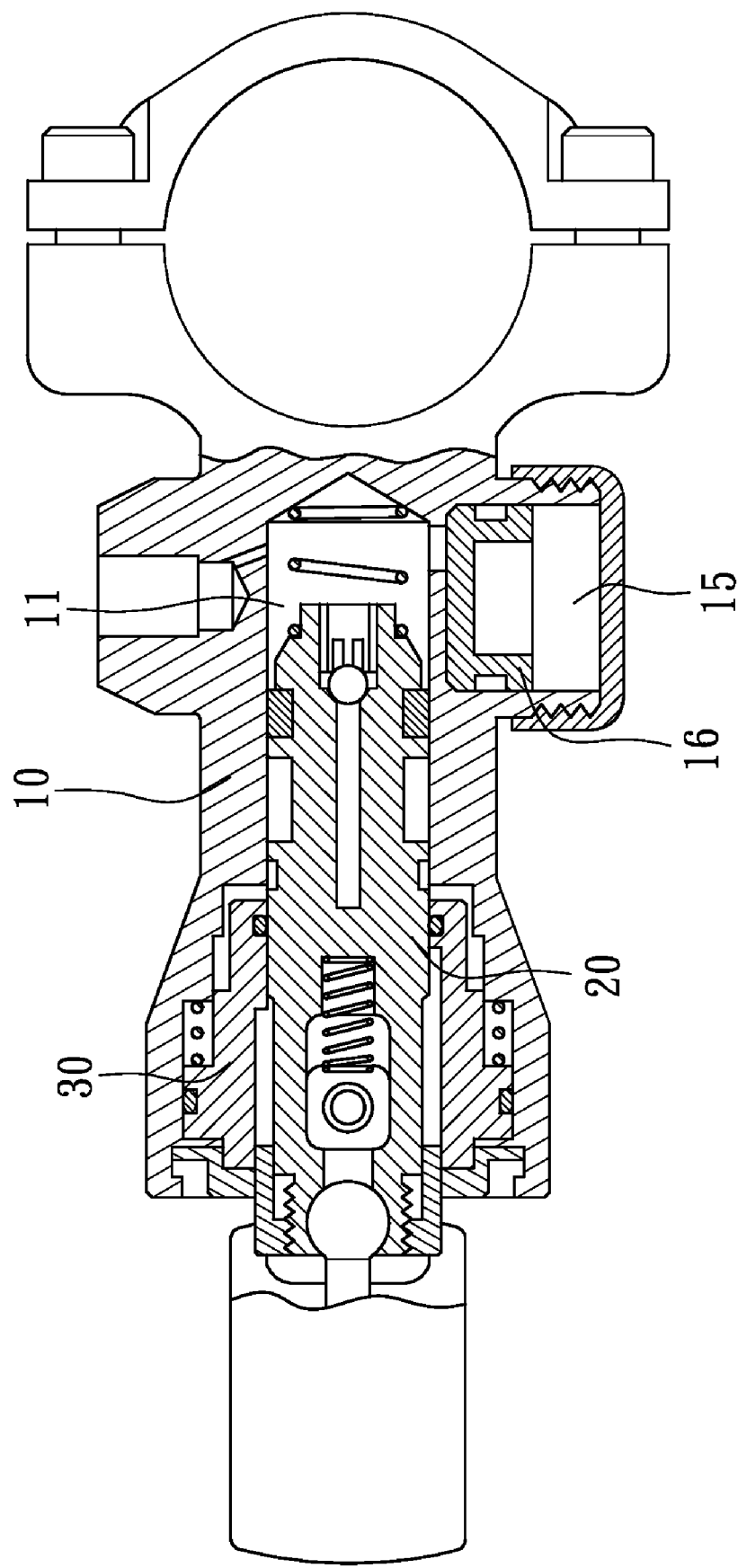
FIG. 7 is a partial cross-sectional view of the hydraulic brake lever assembly in FIG. 1 taken along line 7-7.

Referring to FIGS. 1, 2 and 7, the master cylinder 10 has a subspace 15 defined therein and perpendicularly hydraulically communicating with the main space 11 for sealingly and movabley receiving a slave piston 16. When pulling the lever 40 after the third stage movement, the slave piston 16 is pushed toward a direction away the master cylinder 10 by the hydraulic pressure. This allows the movement ranges of lever to be extended as in addition providing the pressure for braking. Fluid is also passed into the subspace 15. This gives better feel.

Figure 8:
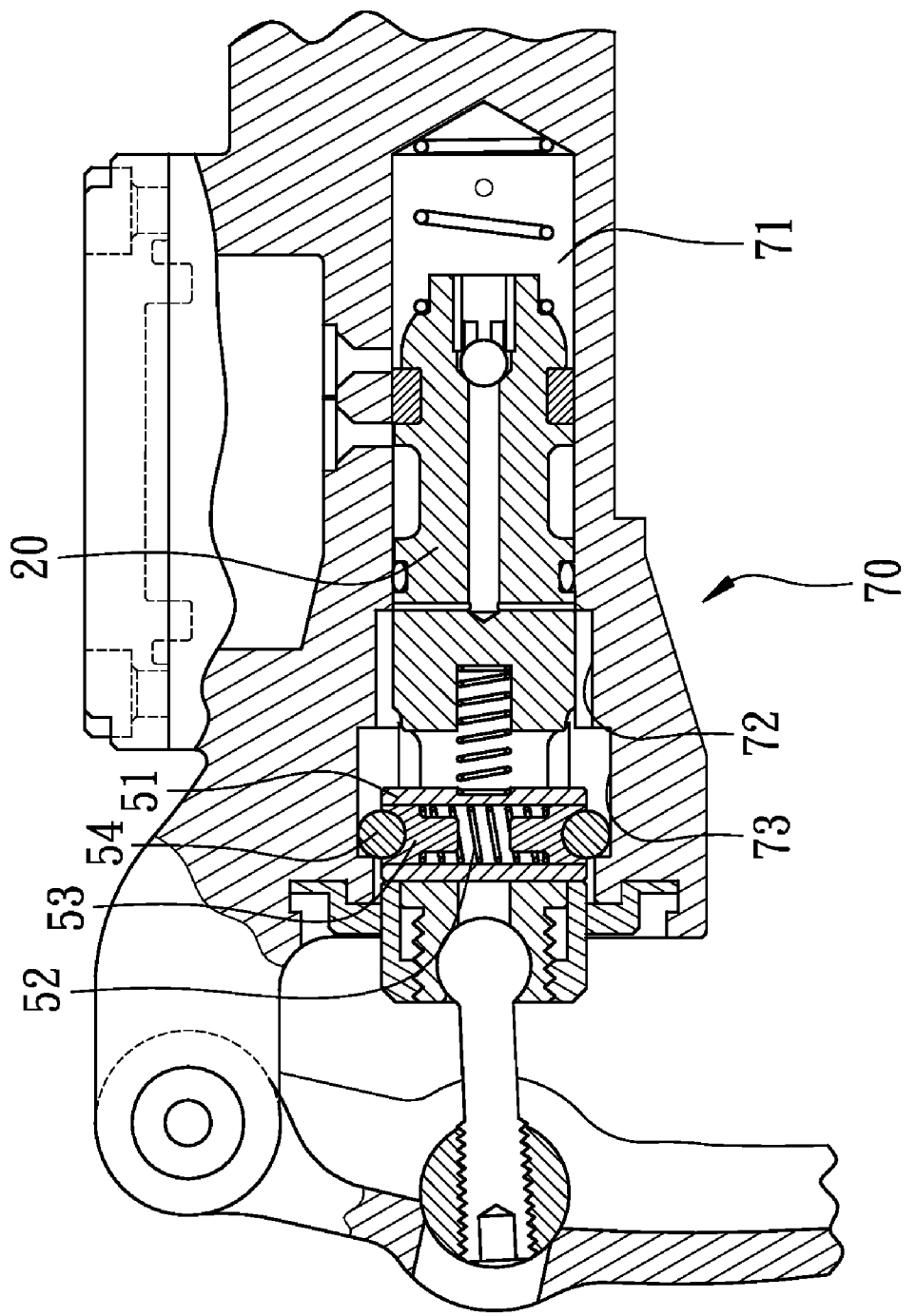
FIG. 8 is a partial cross-sectional view of a second embodiment of the hydraulic brake lever assembly.

Referring to FIG. 8, a second embodiment of a hydraulic brake lever assembly in accordance with the present invention is illustrated. The hydraulic brake lever assembly in accordance with the present invention comprises a master cylinder 70, and a master piston 20 sealingly and movably received in the master cylinder 70.

The master cylinder 70 has a main space 71 longitudinally defined therein for reciprocally receiving the master piston 20. The master cylinder 70 has two raceways 72 radially defined in an inner periphery of the main space 70 and diametrically corresponding to each other. Each raceway 72 has a trough 73 defined in a bottom thereof.

The master piston 20 is sealingly and coaxially disposed in the main space 71. The master piston 20 has a passage 23 diametrically defined therein and extending therethrough for receiving a bias mechanism 50. The passage 23 has an axis perpendicular to that of the master piston 20. The bias mechanism 50 is movably disposed between the two raceways 72.

The bias mechanism 50 includes a sleeve 51, a compress spring 52 placed in the sleeve 51 and having two opposite ends each having a support 53 connected thereto, and two rollers 54 respectively connected to a corresponding one of the two supports 53. The sleeve 51 is movably received in the passage 23 and has an axis parallel to that of the passage 23. One end of each support 53 has a female portion (not numbered) for partially rotatably receiving a corresponding one of the two rollers 54. The other end of each support 53 has a shoulder (not numbered) for securely mounted with the compress spring 52. Each roller 54 of the bias mechanism 50 movably connects to a corresponding one of the two troughs 73.

When the rider pulls the lever 40, each roller 54 of the bias mechanism 50 moves along the corresponding trough 73 in a first stage movement to activate a speed reduction braking. When he/she pulls the lever 40 hard, each roller 54 steps over the troughs 73 and then inward moves along the raceways 72 to activate an emergency braking.

Although the invention has been explained in relation to its preferred embodiment, it is to be understood that many other possible modifications and variations can be made without departing from the spirit and scope of the invention as hereinafter claimed.

What is claimed is:

1. A hydraulic brake lever assembly comprising:
   a master cylinder;
   a master piston sealingly and reciprocally movably received in the master cylinder;
   a floating piston sealingly and reciprocally movably received in the master cylinder, the floating piston having a through hole centrally defined therein for coaxially and sealingly receiving the master piston and two raceways respectively radially defined in an inner periphery of the through hole, the two raceways diametrically corresponding to each other, each raceway having a trough defined in a bottom thereof; and
   a bias mechanism mounted in the master piston and movably connected to the two raceways.

2. The hydraulic brake lever assembly as claimed in claim 1, wherein the master piston has a passage diametrically defined therein and extending therethrough for movably receiving the bias mechanism.

3. The hydraulic brake lever assembly as claimed in claim 2, wherein the bias mechanism includes a sleeve movably received in the passage, a compress spring placed in the sleeve and having two opposite ends each having a support connected thereto, and two rollers respectively connected to a corresponding one of the two supports.

4. The hydraulic brake lever assembly as claimed in claim 3 further comprising an adjusting nut threadedly connected to the master piston and abutted to the sleeve for adjusting a travel distance.

5. The hydraulic brake lever assembly as claimed in claim 1 further comprising a slave piston sealingly and movably disposed in the master cylinder and being axially perpendicular to the master piston for improving braking feel.

6. The hydraulic brake lever assembly as claimed in claim 1, wherein each roller of the bias mechanism moves along a corresponding one of the two troughs in a first stage movement.

7. The hydraulic brake lever assembly as claimed in claim 1, wherein each roller of the bias mechanism reaches a distal end of each of the two raceways and pushes the floating piston in a second stage movement.

8. The hydraulic brake lever assembly as claimed in claim 1, wherein each roller of the bias mechanism steps over the corresponding one of the two troughs and moves along a corresponding one of the two raceways in a third stage movement.

9. A hydraulic brake lever assembly comprising:
   a master cylinder having a main space longitudinally defined therein, the master cylinder having two raceways radially defined in an inner periphery of the main space and diametrically corresponding to each other, each raceway having a trough defined in a bottom thereof;
   a master piston sealingly and reciprocally movably received in the main space; and
   a bias mechanism mounted in the master piston and movably connected to the two raceways.

10. The hydraulic brake lever assembly as claimed in claim 9, wherein the master piston has a passage diametrically defined therein and extending therethrough for movably receiving the bias mechanism.

11. The hydraulic brake lever assembly as claimed in claim 10, wherein the bias mechanism includes a sleeve movably received in the passage, a compress spring placed in the sleeve and having two opposite ends each having a support connected thereto, and two rollers respectively connected to a corresponding one of the two supports.

12. The hydraulic brake lever assembly as claimed in claim 11 further comprising an adjusting nut threadedly connected to the master piston and abutted to the sleeve for adjusting a travel distance.

13. The hydraulic brake lever assembly as claimed in claim 9 further comprising a slave piston sealingly and movably disposed in the master cylinder and being axially perpendicular to the master piston for improving braking feel.

14. The hydraulic brake lever assembly as claimed in claim 9, wherein each roller of the bias mechanism moves along a corresponding one of the two troughs in a first stage movement.

15. The hydraulic brake lever assembly as claimed in claim 9, wherein each roller of the bias mechanism steps over the corresponding one of the two troughs and moves along a corresponding one of the two raceways in a second stage movement.

* * * * *